United States Patent [19]

Milam

[11] Patent Number: 5,112,154

[45] Date of Patent: May 12, 1992

[54] CONNECTION SPACE REDUCTION MECHANISM

[75] Inventor: Malcolm B. Milam, Laurel, Md.

[73] Assignee: The United States of America as represented by the Administrator, National Aeronautics and Space Administration, Washington, D.C.

[21] Appl. No.: 636,532

[22] Filed: Dec. 31, 1990

[51] Int. Cl.$^5$ .............................................. B25G 3/00
[52] U.S. Cl. ......................................... 403/13; 403/24
[58] Field of Search ........................ 403/13, 14, 24, 25

[56] References Cited

U.S. PATENT DOCUMENTS

| Re. 33,249 | 7/1990 | Schneider . |
| 3,268,193 | 8/1966 | Oliveau . |
| 4,232,497 | 11/1980 | Meschnig . |
| 4,367,591 | 1/1983 | Hirabayashi et al. . |
| 4,627,169 | 12/1986 | Zafred et al. . |
| 4,644,541 | 4/1987 | Weyler . |
| 4,679,956 | 7/1987 | Douglas et al. ....................... 403/14 |
| 4,951,521 | 8/1990 | Jacobson . |

FOREIGN PATENT DOCUMENTS 347294 12/1989 European Pat. Off. .............. 403/13

Primary Examiner—Andrew V. Kundrat
Attorney, Agent, or Firm—R. Dennis Marchant; Guy M. Miller; Paul S. Clohan, Jr.

[57] ABSTRACT

A connector assembly comprised of two halves, each respectively including a shell type connector sub-assembly, one being an active half and the other being a passive half. The active half includes an alignment cusp that causes a coupling motion in response to coming in contact with the outer portion of the other half which causes the respective connectors within the two sub-assemblies to move toward each other into coupling relationship at twice the rate at which the two sub-assemblies come together. Both halves are adapted to rotate about and translate along respective mutually orthogonal axes to facilitate an interconnection.

20 Claims, 5 Drawing Sheets

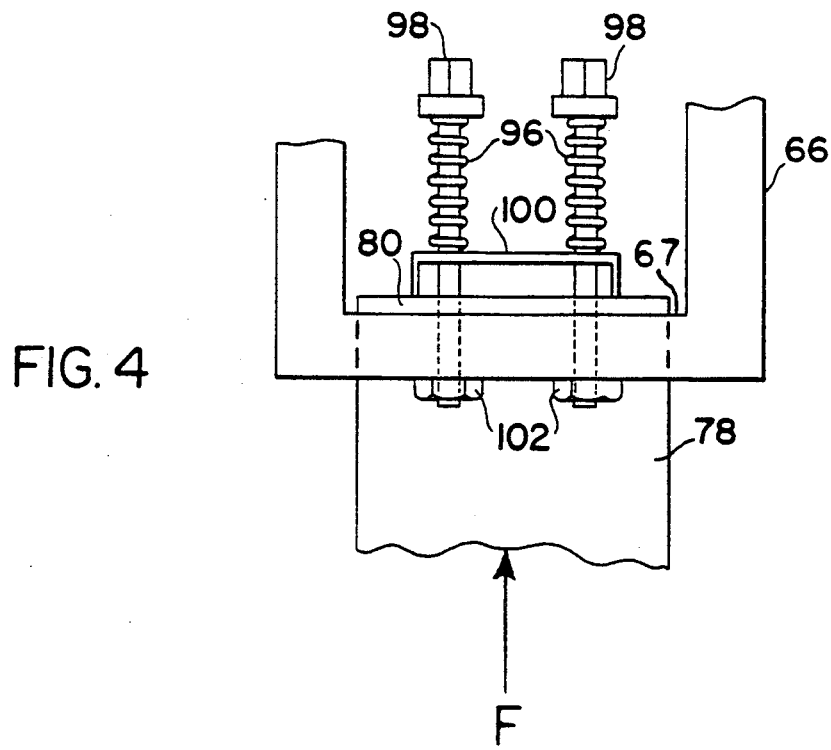

CONNECTION SPACE REDUCTION MECHANISM

ORIGIN OF THE INVENTION

The invention described herein was made by an employee of the United States Government, and may be manufactured and used by or for the Government for governmental purposes without the payment of any royalties thereon or therefor.

BACKGROUND OF THE INVENTION

The present invention relates to a connector and in particular to a connector that can be used to connect a pay load orbited into space to a space station member.

There are many kinds of connectors used in making various types of connections, be they mechanical, electrical or thermal connections These types of connectors do not require further description herein.

Connectors used in space flight, however, have special alignment and mating requirements because of their unique use. For example, in space flight there is a necessity for making a connection between what is known as a station interface adapter (SIA) and a pay load interface adapter (PIA). It is necessary to make these connections because connections between the PIA and the SIA must be made to provide a power utility connector, a power data connector and a thermal utility connector.

Generally, two categories of connecting can be made, one is an orthogonal connection between the PIA/SIA interface, the other is a parallel connection. In these two categories of connection, some concepts used the mechanical power of attachment mechanism while others have independent motors.

As understood, to provide a device that can be connected without the use of an independent motor would reduce the number of mechanical parts and thus be a tremendous cost in savings complexity with no effect on the function of the utility connections.

Also connectors for this type of device require that the connectors be easily mated so that the connector pins will not bend. The requirement for easily mating is necessary because the connectors must have a mating trajectory plot compatible with the SIA PIA interface trajectory plot. A device used with alignment pins resulted in a problem that the pins are very large and obtrusive, presenting a collision and snag hazard.

SUMMARY OF THE INVENTION

Accordingly, it is an object of the present invention to provide an improved connector for use in outer space and in applications where large interfaces are mated.

It is a further object to provide a connector for use in outer space to couple station interface adapter systems with payload interface adapter systems.

Another object of this invention is to eliminate the requirement for tight tolerances over large distances for connectors of this type.

A still further object of this invention is to provide connections which provide a two to one interface motion to connector motion ratio.

Briefly, the invention is directed to a mating type connector assembly comprised of two halves, each respectively including a shell type connector sub-assembly, one being an active half and the other being a passive half. The active half includes an alignment cusp that provides a coupling motion in response to coming in contact with the outer portion of the other half which causes the respective connectors within the two sub-assemblies to move toward each other into coupling relationship at twice the rate at which the two sub-assemblies come together. Both halves are adapted to rotate about an axis and translate orthogonally along that axis to facilitate connection. These axes are orthogonal.

BRIEF DESCRIPTION OF THE DRAWINGS

The present invention will be more fully understood from the detailed description given hereinbelow and the accompanying drawings which are given by way of illustration only, and are thus not limited to the present invention and wherein:

FIGS. 4 is a side elevational view illustrating the spring loaded mounting of one of the connectors in the embodiment shown in FIG. 3;

FIG. 5 is a partially cut-away perspective view of a second embodiment of the invention;

DETAILED DESCRIPTION OF THE PREFERRED EMBODIMENTS

Figure 1:
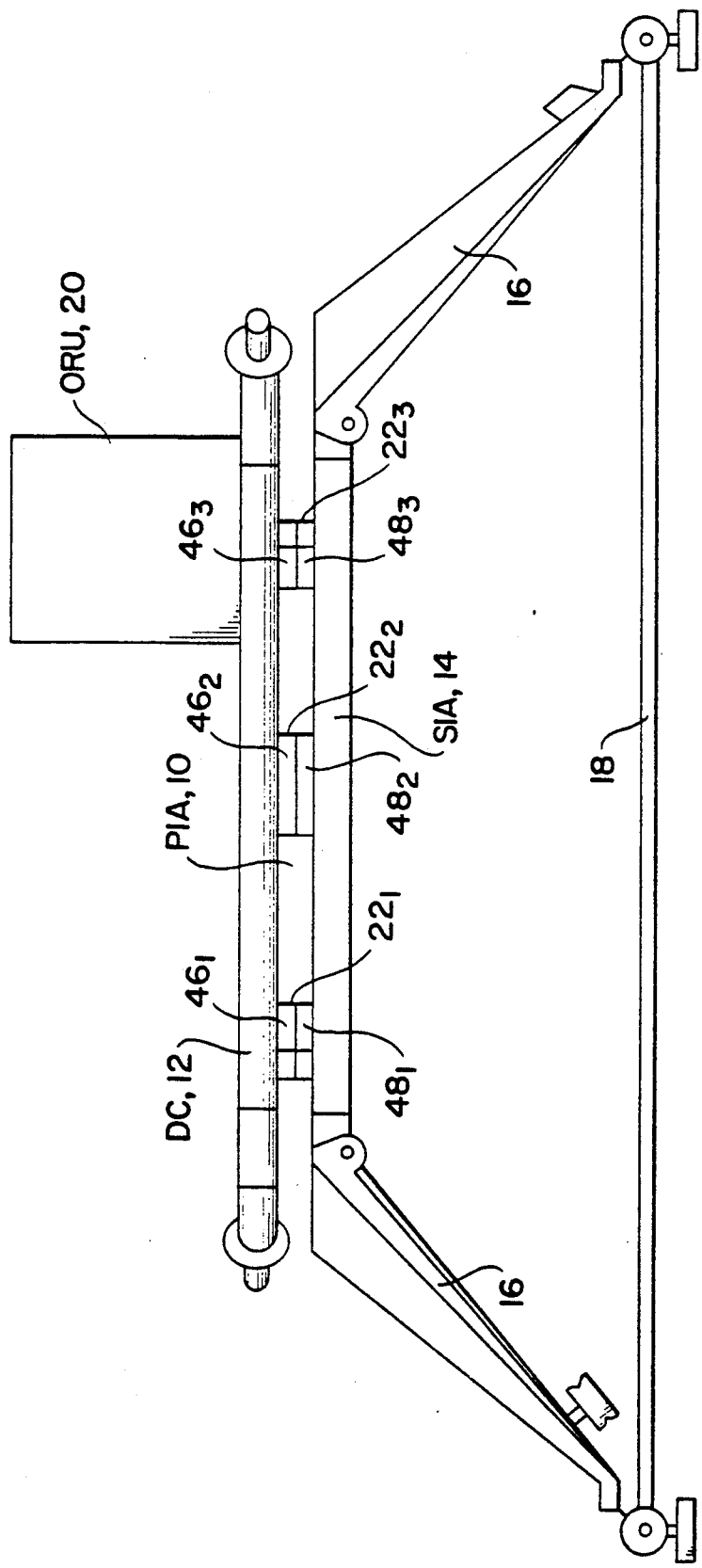
FIG. 1 is a side elevational view diagrammatically showing a station interface adapter (SIA) connected to a payload interface adapter (PIA)

Referring now to the drawing figures and more particularly to FIG. 1, shown thereat is a payload interface adapter (PIA) 10 mounted on a deck carrier (DC) 12, and being connected to a station interface adapter (SIA) 14. The station interface adapter 14 is shown including a plurality of legs 16 and at least one cross-brace truss member 18. A payload interface orbital replacement unit (ORU) 20 is shown located on the top of the deck carrier 12. Three like connector assemblies $22_1$, $22_2$ and $22_3$, which form the subject matter of this invention, interconnect the PIA structure 10 with the SIA structure 14.

Figure 2:
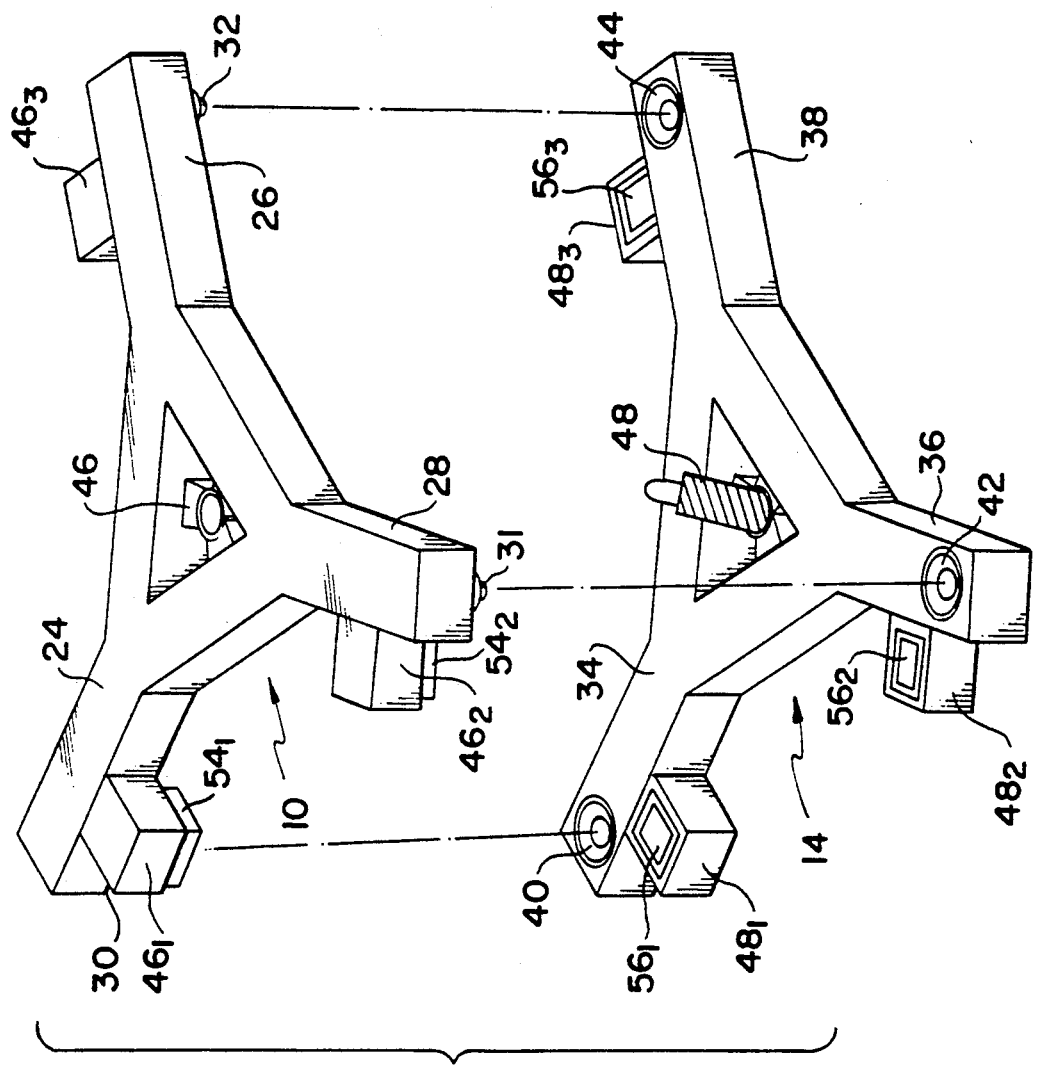
FIG. 2 is a perspective view generally illustrative of the payload interface adapter and a station interface adapter shown in FIG. 1.

As shown in FIG. 2, the PIA 10 comprises a triangular structure having three outwardly extending extremities or arm sections 24, 26 and 28. Guide pins 30, 31 and 32 are shown extending from the bottom of arms 24, 26 and 28. The SIA 14 also comprises triangular structure which matches that of the PIA 10 and includes three arm sections 34, 36 and 38 but now having guide cone 40, 42 and 44 on the upper surface for receiving the guide pins located on the underside of the PIA arms 24, 26 and 28. Further as shown in FIG. 2, the PIA 10 is equipped with a centrally located floating nut device 46 which is adapted to engage a similarly located motorized acme screw 48 on the SIA 14. These latter two elements operate to lock the PIA 10 and the SIA 14 together when mated.

Figure 3:
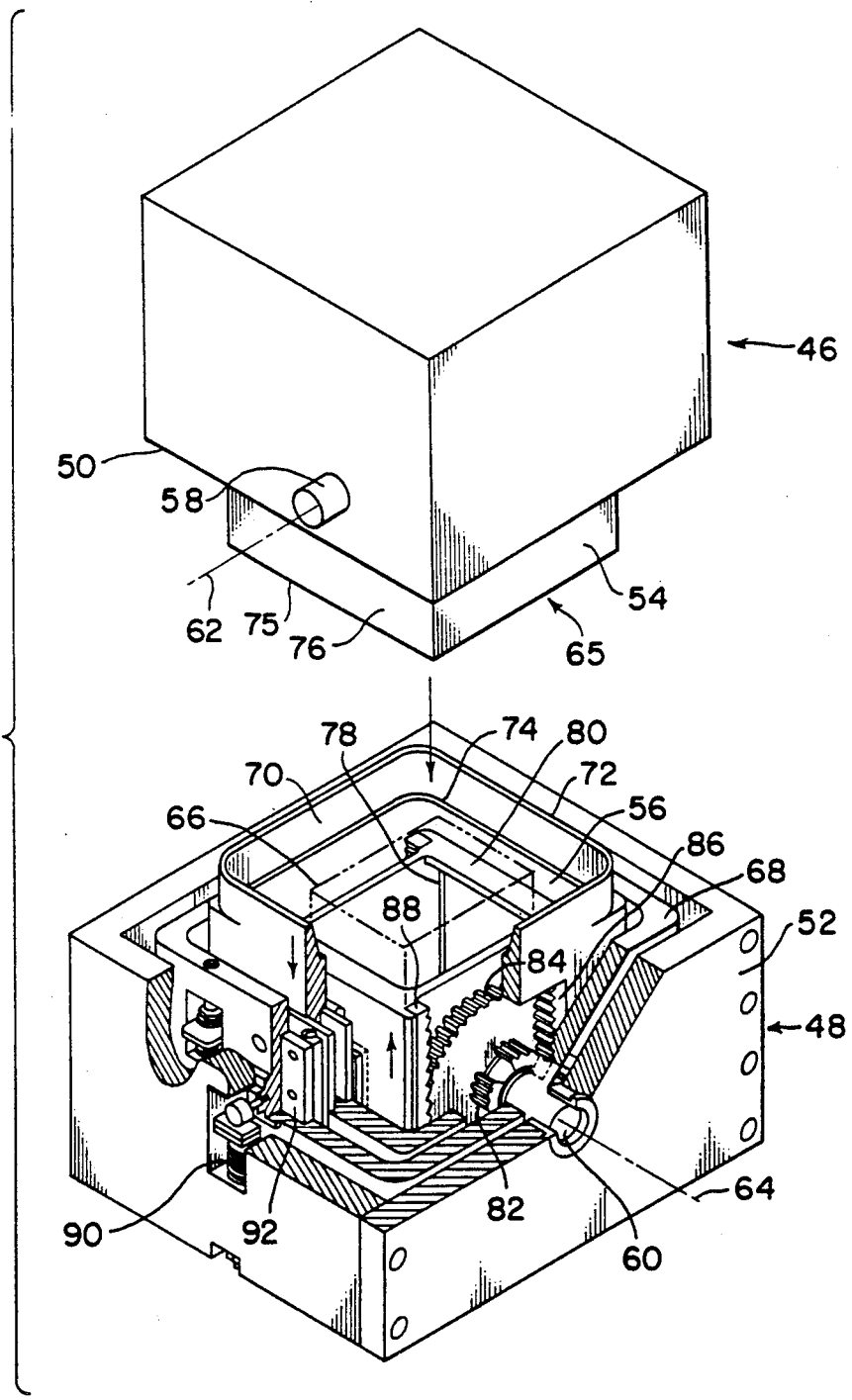
FIG. 3 is a perspective view of a first embodiment of the invention showing two sub-assembly halves of a connector assembly.

Referring now to FIG. 3, shown thereat are the details of the first embodiment of the invention and which comprises one connection assembly 22 of the three connector assemblies $22_1$, $22_2$, $22_3$ shown in FIG. 1. Each connector assembly 22 is comprised of two mating halves 46 and 48, with the upper half 46 comprising a passive member, while the lower half 48 comprises an active member. The passive and active members include a generally rectangular box-like mounting frame 50 and 52, respectively, which are designed to house rectangular shell type connector mounting sub-assemblies 54 and 56, respectively. The connector sub-assemblies 54 and 56 are further pivoted on respective axle type bushings 58 and 60, which also permit the sub-assemblies to translate laterally along the axes 62 and 64.

The upper or passive sub-assembly 54 includes a connector 65, not shown, which is adapted to mate with a complementary type connector 66 shown in phantom view within the lower sub-assembly 56. The connector 66 may be, for example, an electrical connector having outwardly extending pins which are to engage female type connector elements of the connector 65 located in the upper passive connector mounting sub-assembly 54.

What is particularly significant about the configuration shown in FIG. 3 are the structural details of the active or lower half sub-assembly 56 and which is shown in cutaway fashion so as to illustrate the inventive feature incorporated therein. As shown, an inner rectangular housing member 68 is secured to the shaft of the bushing 60. Inwardly of the housing member 68 is a respective shell type activation cusp 70 which includes an outwardly beveled rim section 72 which terminates in an inner edge 74. The edge 74 extends completely around the inner wall surface of the rim section 72 and has for its purpose engaging the outer edge 75 of the downwardly extending rim portion 76 of the upper sub-assembly 54.

Further as shown, a connector mount 78 including an upper mounting plate 80 for the connector 66 is located inside of the activation cusp 70 and is designed to be driven by a dual rack and pinion mechanism consisting of a pair of pinion gears 82 and 84 secured to the axle type bushing 60. Pinion gear 82 is smaller than the pinion gear 84 to provide, for example, a 2:1 gear ratio. The smaller outside pinion gear engages a rack gear portion 86 located in the side of the cusp 70, while the inner pinion gear 84 engages a rack gear member 88 located on the outer wall of the connector mount 78. Although not shown, this mechanism is duplicated on the opposite side of the cusp 70, so that a balanced implementation is provided. Further as shown, the inner housing member 68 containing both the activation cusp 70 and the connector mounting sub-assembly 56 is positioned on a pair of centralized compression spring assemblies, one of which is shown by reference numeral 90. A pair of linear bearing assemblies 92, furthermore, are located on opposite sides of the mounting frame 52 in order to provide relative motion between the activation cusp 70 and the connector mount 78.

In operation, when the upper or passive half 46 is lowered into contact with the lower half 48, the edge 75 of the rim portion 76 engages the edge 74 inside of the cusp 70, causing it to descend. The descending motion of cusp 70 causes the rack member 86 to turn the relatively smaller pinion gear 82 in a clockwise direction. This in turn causes the relatively larger pinion gear 84 to push the second rack member 88 in an upward direction. Due to the gear ratio between the two pinion gears 82 and 84, the connector mount body 78 is caused to move upward at a greater rate (2:1) than the downward movement of the cusp 70. This eliminates the requirement for tight tolerances over large distances for the connector members, thus permitting blind mate connectors of all types to be used.

It should be noted that the two rotational gimbal axes 62 and 64 are orthogonal to one another. This allows for mutual misalignment of the two mating interfaces 54 and 56 in rotation and translation about two axes. Each sub-assembly is gimbaled about only one axis so that binding and pin bending will be eliminated upon demating of the connectors.

Referring now to FIG. 4, there is a requirement that malfunctioning or damaged connectors must not interfere with structural attachment. This is simply achieved by mounting one of the connector halves, e.g. connector 78, on springs, with a preload exceeding the normal connector force, typically by as much as 50%. If the connector half 78 is damaged, it will simply push out of the way, while allowing structural mating. As shown in FIG. 4, the connector member 78 having a top horizontal edge 80 is seated on the upper horizontal surface portion 67 of the connector mount body 66 by one or more tension springs 96 located around respective elongated bolt members 98 extending through the top part 100 of the connector half 78 and including a respective nut 102 on the lower end. Thus any unusual excessive downward force F on the connector 78 can be alleviated by stretching against the springs 96, which will return to its rest position once the excessive force is removed.

Referring now to FIG. 5, shown thereat is a second embodiment of the invention and which is directed to an active shell type connector sub-assembly 48'. This unit is comprised of a modified mounting frame 52' which includes four mounting holes, three of which are shown by reference numerals 104, 106 and 108 for receiving vertically descending corner posts 110, 112, 114 and 116, the latter not being shown, attached to the four corners of a modified activation cusp 70'. The cusp 70' still includes the inner activating edge 74, as before, which is adapted to engage the lower edge 75 of the passive sub-assembly 46.

Inside of the mounting frame 52' is a generally rectangular body member 118 which has a top flat surface 120 for holding an open box type connector mount 122. This configuration eliminates the dual rack and pinion assembly shown in FIG. 3 and now includes a pivoted actuator arm 124 having a pair of arm segments 126 and 128 of unequal length and having a length ratio of, for example, 2:1, which terminate in outwardly extending roller members 130 and 132. The actuator arm 124 is connected to a pivot shaft 134 which is mounted in one side member 136 of the mounting frame 52'.

It can be seen that a downward force exerted on the inside edge 74 of the activation cusp 70' forces the shorter arm segment 126 downward. This is accompanied by an upward movement of the longer arm segment 124, causing the connector body member 118 and the body 118 and connector mount 122 to rise at a faster rate than the downward movement of the activation cusp 70'. While in the present invention the upward movement of the connector mount 122 is made to be twice that of the downward movement of the activation cusp 70', it should be noted that when desirable any other mechanical advantage may be resorted to, depending upon the particular application, simply by altering the relative lengths of the arm segments 126 and 128.

Figure 6A:
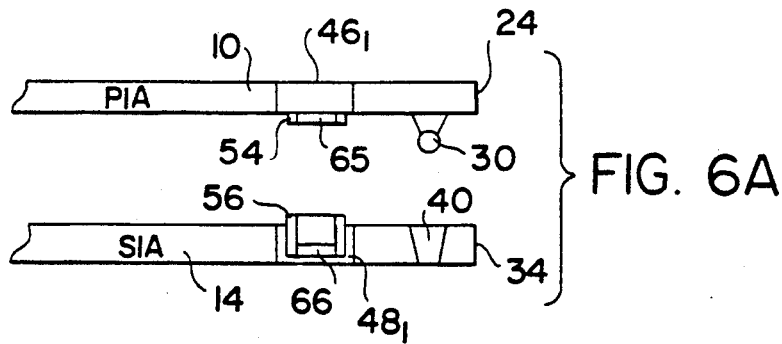
FIGS. 6A–6E are a set of mechanical schematic diagrams illustrative of the steps involved in making a connection between a PIA and an SIA using a connector device in accordance with the disclosed invention.
Figure 6B:
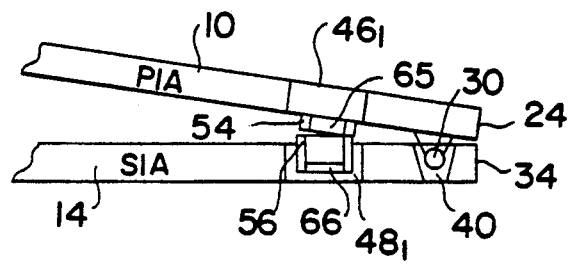
Figure 6C:
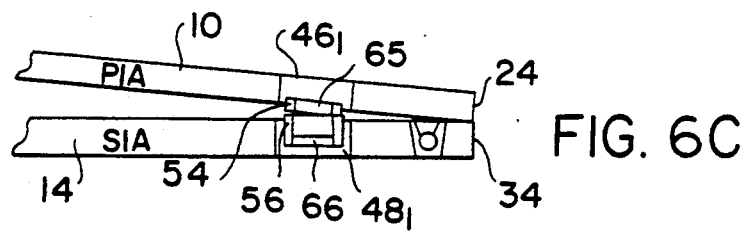
Figure 6D:
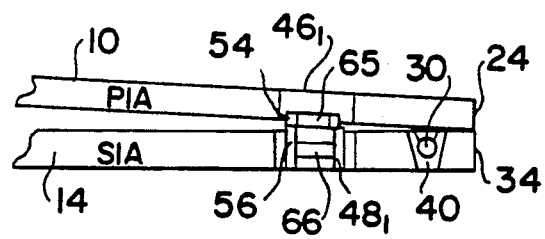
Figure 6E:
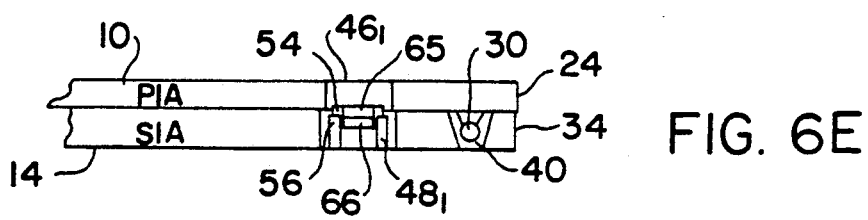

FIGS. 6A through 6E are schematically illustrative of the sequence of operation wherein the payload interface adapter (PIA) 10 and the stationary interface adapter (SIA) mate. As the PIA 10 and the SIA 14 approach each other, as shown in FIG. 6A, they are brought in mutually close parallel proximity to one another. In FIG. 6B, there is shown a situation which is considered to be a worst case of misalignment where the PIA 10 is tilted relative to the SIA 14, but guide pin 30 still engages the guide cone 40. The two connector members 65 and 66 are skewed. As further shown in FIG. 6C, the cusp 70 comes into contact with the upper rim section 76 of the passive sub-assembly 76' which includes the connector member 65. At this point the sub-assemblies $46_1$ and $48_1$ gimbal to become parallel, which is further shown in FIG. 6D. As the interface height between the PIA 10 and the SIA 14 is reduced, the cusp 70 begins to move the connector member 66 upwardly to meet the conductor member 65 at twice the rate of the downward movement of the cusp 70. At FIG. 6E, the two connector halves 65 and 66 are mated and the PIA 10 and the SIA 14 are in mutual contact.

Thus what has been shown and described is an improved interface connector mechanism in which two connectors are caused to move into coupling relationship at a rate faster than the rate in which two sub-assemblies holding the connectors come together.

The invention having thus been described, it will be noted that the same may be varied in many ways and thus other modifications, alterations and changes may be resorted to. However, such variations are not meant to be regarded as a departure from the spirit and scope of the invention, since all modifications as would be obvious to one skilled in the art as defined within the scope of the following claims, are meant to be included.

I claim:

1. A connector assembly for providing at least electrical power and electrical data connections at an interface between two interconnected structural members, comprising:
   first and second mating connector assembly halves, wherein said first half of said connector assembly includes,
   a first frame,
   an active connector sub-assembly mounted on said first frame,
   first connector member mounting means positioned inside of said active connector sub-assembly, and
   means coupling said connector sub-assembly and said first connector member mounting means for providing relative movement between said sub-assembly and said first mounting means in mutually opposite directions when a portion of said active connector sub-assembly is urged in a predetermined direction; and
   wherein said second half of said connector assembly includes,
   a second frame,
   a passive connector sub-assembly mounted on said second frame,
   a second connector member mounting means positioned inside of said passive connector sub-assembly, and
   means on said passive connector sub-assembly for activating said means for providing movement in said predetermined direction when said first and second halves of said connector assembly are brought together and said first connector member mounting means moves towards said second connector member mounting means.

2. The connector assembly as defined by claim 1 wherein said coupling means for providing relative movement between said active connector sub-assembly and said first connector member mounting means includes,
   means for moving said first connector member mounting means at a rate greater than said active connector sub-assembly when activated.

3. The connector assembly as defined by claim 2 wherein the rate of movement of said first connector member mounting means is at least twice the rate of movement of said active connector sub-assembly.

4. The connector assembly as defined by claim 2 wherein said active connector sub-assembly and said passive connector sub-assembly are respectively gimbal mounted on said first and said second frames.

5. The connector assembly as defined by claim 4 wherein said active connector sub-assembly includes,
   an axle fitted to said first frame along a first rotational axis and wherein said passive connector sub-assembly includes,
   a second axle fitted to said second frame along a rotational axis which is perpendicular to said first rotational axis.

6. The connector assembly as defined by claim 1 wherein said portion of said active connector sub-assembly includes,
   a cusp formed at the top thereof, wherein said cusp is engageable with said means for activating on said passive connector sub-assembly.

7. The connector assembly as defined by claim 6 wherein said means for activating comprises,
   an outer edge of an outwardly projecting shell member engageable with said cusp and wherein said cusp also includes,
   an inner peripheral edge for abutment with said outer edge of said shell member of the said passive connector sub-assembly.

8. The connector assembly as defined by claim 7 wherein said cusp comprises,
   an outwardly projecting shell member having an outer rim section terminating in said inner peripheral edge for receiving the lower edge of said passive connector sub-assembly shell member.

9. The connector assembly as defined by claim 8 wherein said coupling means for providing relative movement between said active connector sub-assembly and said first connector member mounting means thereof includes a rack and pinion gear mechanism.

10. The connector assembly as defined by claim 9 wherein said rack and pinion gear mechanism includes, first and second pinion gears mounted on said first axle and wherein said second pinion gear has a greater number of gear teeth than said first pinion gear,
    a first rack member located on said active connector sub-assembly and engageable with said first pinion gear, and
    a second rack member engageable with said second pinion gear and mounted on said first connector member mounting means,
    whereby activation of said first rack member in a first direction causes movement of said first connector member mounting means in a second and opposite direction and at a rate greater than the rate of movement of said active connector sub-assembly.

11. The connector assembly as defined by claim 10 wherein said first and second pinion gears have a gear ratio therebetween which causes the rate of movement of said first connector member mounting means in said second direction to be at least twice the rate of movement of said connector sub-assembly in said first direction.

12. The connector assembly as defined by claim 11 wherein at least one of said connector member mounting means includes mounting spring means for a connector member mounted thereat.

13. The connector assembly as defined by claim 8 and additionally including,
   bearing means between said active connector subassembly and said connector member mounting means.

14. The connector assembly as defined by claim 8 wherein said first and second frames comprise,
   generally rectangular box-like body members, respectively, having one open side for said active and passive connector sub-assemblies and respective connector member mounting means positioned therein to project therefrom.

15. The connector assembly as defined by claim 14 and additionally including,
   at least one intermediate housing member between said first frame and said active connector sub-assembly.

16. The connector assembly as defined by claim 2 wherein said coupling means for providing relative movement between said active connector sub-assembly and said first connector member mounting means includes,
   a pivoted arm member having first and second arm segments extending outward from a pivot axis, said first arm segment being in contact with said active connector sub-assembly and said second arm segment being in contact with said first connector member mounting means.

17. The connector assembly as defined by claim 16 wherein,
   said second arm segment is longer than said first arm segment,
   whereby movement of said active connector sub-assembly in said predetermined direction by said means for activating results in movement of said first connector member mounting means at a greater rate in the opposite direction.

18. The connector assembly as defined by claim 17 and wherein the relative lengths of said arm segments provide a rate of movement of said first connector member mounting means which is at least twice the rate of movement of said active connector sub-assembly.

19. The connector assembly as defined by claim 17 wherein said portion of said active connector sub-assembly includes,
   a cusp at the top thereof and wherein said cusp is engageable with said means for activating on said passive connector sub-assembly.

20. The connector assembly as defined by claim 19 wherein said means for activating comprises,
   an outer edge of an outwardly projecting shell member engageable with said cusp, and
   wherein said cusp also includes,
   an inner peripheral edge for abutment with the outer edge of said shell member of the passive connector sub-assembly.

* * * * *